United States Patent [19]
Ayers et al.

[11] Patent Number: 5,865,502
[45] Date of Patent: Feb. 2, 1999

[54] STORAGE HOLDER FOR A STEERING WHEEL LOCK BAR

[76] Inventors: Lawrence J. Ayers, 92 Webster St., Haverhill, Mass. 01830; Robert A. Collins, Jr., 45 Macy St. Apt. 105A, Amesbury, Mass. 01913; Geremy M. Ayers, 92 Webster St., Haverhill, Mass. 01830

[21] Appl. No.: 966,684

[22] Filed: Nov. 10, 1997

[51] Int. Cl.⁶ ..................................................... A47C 7/62
[52] U.S. Cl. .................... 297/188.06; 224/275; 224/563; 224/572
[58] Field of Search ........................ 297/188.04, 188.06, 297/188.07, 188.01, 188.2; 224/275, 563, 572

[56] References Cited

U.S. PATENT DOCUMENTS

| | | | |
|---|---|---|---|
| 1,527,056 | 2/1925 | Martin | 224/572 |
| 2,223,532 | 12/1940 | Sallop | 297/188.06 X |
| 4,487,345 | 12/1984 | Pierce et al. | 297/188.07 X |
| 5,407,111 | 4/1995 | Lanouette et al. | 224/572 X |

FOREIGN PATENT DOCUMENTS

| | | | |
|---|---|---|---|
| 2907241 | 9/1979 | Germany | 297/188.06 |
| 1476493 | 6/1977 | United Kingdom | 297/188.07 |

*Primary Examiner*—Peter R. Brown
*Attorney, Agent, or Firm*—Frederick R. Cantor, Esq.

[57] ABSTRACT

A steering wheel lock bar can be stored in a holder mounted on a rear face of a vehicle passenger seat back. The holder preferably includes an elongated cloth pocket acutely angled to a vertical midplane taken through the seat back, so that an elongated steering wheel lock bar can be manipulated into or out of the pocket without striking the vehicle roof. The driver of the vehicle can reach the storage pocket without leaving the driver seat.

20 Claims, 2 Drawing Sheets

STORAGE HOLDER FOR A STEERING WHEEL LOCK BAR

BACKGROUND OF THE PRESENT INVENTION

SUMMARY OF THE PRESENT INVENTION

This invention relates to a storage holder for a steering wheel lock bar, especially a holder adapted for installation on the rear face of a seat back in an automotive vehicle. The holder is designed to provide a wheel lock bar storage pocket that is relatively unobstructive and space efficient in the automotive vehicle, while at the same time being easily accessible for insertion or withdrawal of a wheel lock bar.

Wheel lock bars are applied to the steering wheels of automotive vehicles for the purpose of preventing vehicle theft. One steering wheel lock that has been used commercially is shown in U.S. Pat. No. 4,738,127 issued to C. R. Johnson on Apr. 19, 1988. The wheel lock bar comprises an elongated bar having a hook on one end and a key operated lock on the other end. A second elongated bar having a second hook is telescopically fitted to the lock, whereby the bars can be expanded to cause the hooks to fit onto interior surfaces of a vehicle steering wheel so that the vehicle is incapable of being steered.

Commercially available steering wheel lock bars are relatively bulky so that storage of such lock bars in automotive vehicles is a problem. Typically, the steering wheel lock bar has a length of about twenty inches and a transverse width of about five inches. The relatively great long bar length makes lock bar storage and manipulation difficult.

Various storage devices have been proposed for use in automotive vehicles. U.S. Pat. No. Des. 279,061, issued to S. Zabielinsky shows a storage pocket carried on the rear face of a seat back in an automotive vehicle. The storage pocket is not large enough to hold a conventional steering wheel lock bar. The steering wheel lock bar is much too long to fit into the storage pocket shown in the Zabielinsky Design Patent.

U.S. Pat. No. 3,273,769, issued to M. Miller on Sep. 20, 1996, shows a holder for an umbrella locatable on an interior surface of a vehicle door. The holder comprises a socket adapted to receive one end of an umbrella and an upwardly open cradle adapted to support the umbrella at a point near the umbrella handle. The holder shown in the Miller patent is not designed, or configured, to support a conventional steering wheel lock bar.

U.S. Pat. No. 3,706,403, issued to R. Sikes, discloses a cradle structure mountable on a raised portion of a vehicle floor to partially retain a long gun in a prone position adjacent to the driver's seat.

U.S. Pat. No. 5,129,563, issued to J. Dillon, shows a gun storage mechanism located near the front edges of the vehicle front seats, whereby a gun can be stored in a transverse position spanning the two seats.

U.S. Pat. No. 5,222,381 discloses a portable holder for a steering wheel lock bar, wherein two hook structures can be moved to lock the holder to the lock bar. The holder is attached to a chain that is anchored to the vehicle, whereby the holder can be moved a limited distance within the vehicle.

The present invention relates to a storage holder for a steering wheel lock bar located on the rear face of a vehicle seat back. The holder comprises an elongated upwardly open pocket having an entrance opening positioned near the upper edge of the vehicle seat back, whereby the driver can reach the pocket opening by turning in the seat; the driver does not need to leave the driver's seat in order to access the pocket opening.

The holder is mounted in a non-vertical tilted condition on the rear face of the vehicle seat back, such that the elongated steering wheel lock bar is oriented in a non-vertical position while it is being inserted into the storage pocket or removed from the storage pocket. This prevents any obstruction to steering wheel lock bar motion that the vehicle roof might otherwise offer.

In many vehicles the vertical spacing between the upper edge of the seat back and the roof is about twenty inches. The normal length of a conventional steering wheel lock bar is also about twenty inches. If the storage pocket for the steering wheel lock bar were oriented in a vertical position it would be somewhat difficult to insert the lock bar into the pocket or remove the lock bar from the pocket. The upper end of the lock bar would tend to strike the roof during the process of accessing the pocket. By orienting the pocket in a tilted non-vertical position on the rear face of the vehicle seat back the process of manipulating the lock bar into or out of the pocket becomes relatively easy. The vehicle roof does not present an obstruction to lock bar movement.

In preferred practice of the invention the steering wheel lock bar storage pocket is formed at least partly of relatively soft woven cloth materials, in order to avoid human safety problems in crash situations. The pocket structure is kept in an open condition by means of an elongated channel cross-sectioned insert formed of a deformable plastic material having some shock-absorbing capabilities.

The storage pocket may be attached to the rear face of a vehicle seat back by two parallel straps that extend generally vertically at an acute angle to the tilted pocket structure. Lower ends of the vertical straps have hooks that connect with fixed anchorages near the vehicle floor. The upper end of one of the straps is adapted to be looped around a mounting post for a headrest at the upper edge of the vehicle seat back. The looped portion of the strap is connected to an upper end of the other strap, whereby the straps are tensioned to retain the pocket structure in a tilted condition on the rear face of the vehicle seat back.

Specific features of the invention will be apparent from the attached drawings and description of an illustrative embodiment of the invention.

In summary, and in accordance with the above discussion, the foregoing objectives are achieved in the following embodiments.

DESCRIPTION OF THE PREFERRED EMBODIMENTS OF THE PRESENT INVENTION

Figure 1:
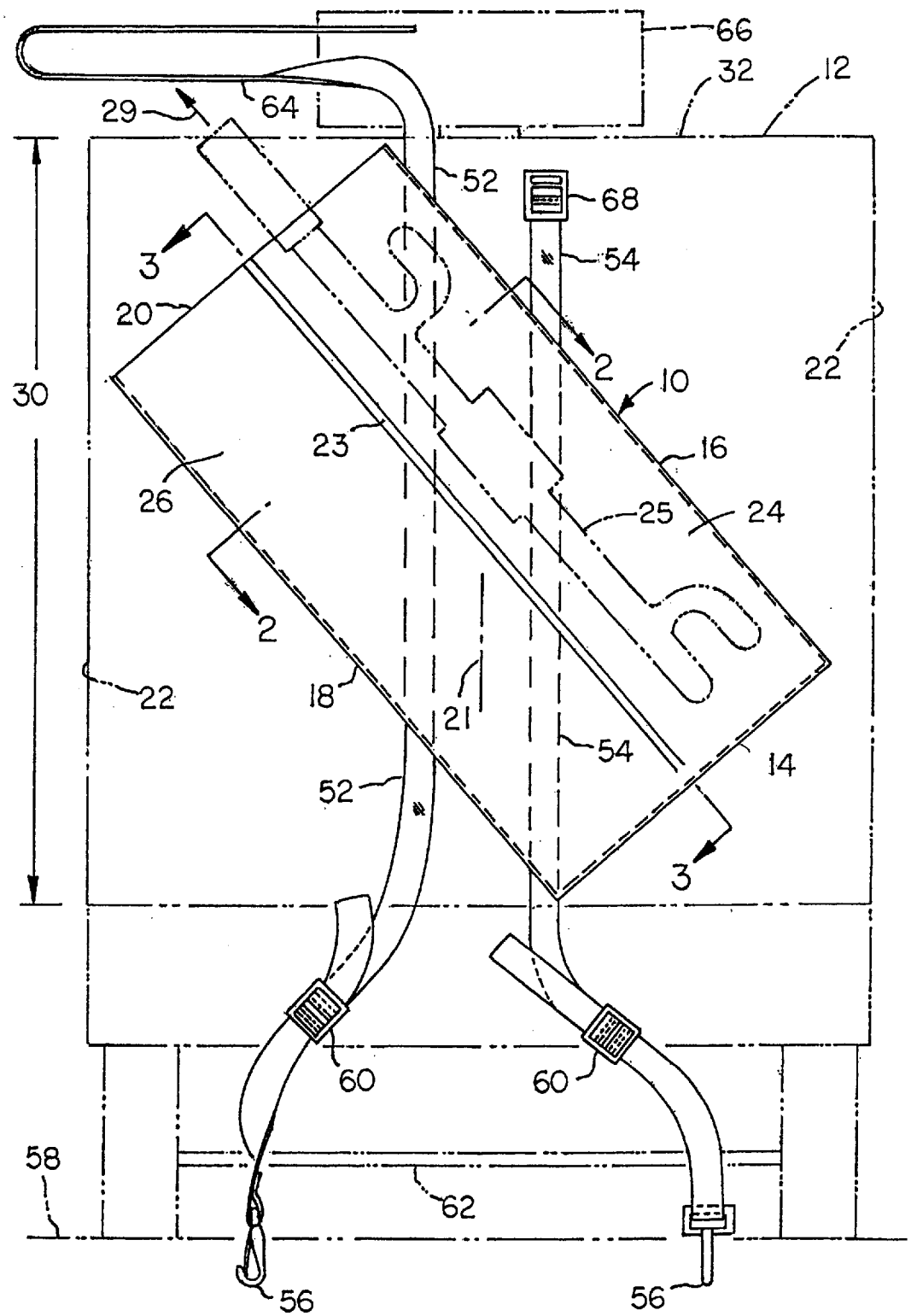
FIG. 1, is an elevational view, of a steering wheel lock bar holder embodying the invention. The holder is shown in a mounted position on the rear face of a vehicle seat back. The seat back is shown in dashed lines.

FIG. 1, is an elevational view, of a steering wheel lock bar holder embodying the invention. The holder is shown in a mounted position on the rear face of a vehicle seat back. The seat back is shown in dashed lines.

The drawings show a steering wheel lock bar holder 10 mounted on the rear face of a vehicle seat back 12. As shown in FIG. 1, the holder has a lower edge 14, side edges 16 and 18, and an upper edge 20. The holder is positioned centrally on the rear face of seat back 12 approximately midway between side edges 22 of the seat back.

Holder 10 comprises a rectangular casing that is oriented in a non-vertical tilted condition, wherein side edges 16 and 18 are acutely angled to a vertical plane 21 taken generally normal to the seat back. The holder has a central strip area 23 that subdivides the holder into two elongated pockets 24 and 26 extending parallel to side edges 16 and 18. Each pocket has an upwardly open entrance mouth located at the upper edge 20 of the holder (casing). Pocket 24 can be used for storing an elongated steering wheel lock bar 25. Pocket 26 can be used for storing other items, such as an umbrella and/or snow removal brush, etc. The steering wheel lock bar is removed from pocket 24 by grasping the protruding lock bar handle and pulling the lock bar out of the pocket along directional line 29.

The longitudinal dimension of the holder (parallel to side edges 16 and 18) is roughly the same as the height of the seat back, represented by numeral 30 in FIG. 1. Typically the holder has a longitudinal dimension of about twenty or twenty-one inches, roughly the same as the length of the steering wheel lock bar 25.

Holder 10 is oriented in a non-vertical tilted condition in order to reduce the vertical travel necessary to insert, or remove, the steering wheel lock bar 25 to, or from, pocket 24. Such reduction in vertical travel is necessary in order to avoid striking the lock bar against the vehicle roof. Typically, there is a vertical clearance between the upper edge 32 of seat back 12 and the vehicle roof, measuring on the order of twenty inches. If pocket 24 were oriented vertically on the rear face of the seat back there would be a danger of the lock bar striking the roof during the process of inserting or removing the lock bar to or from the storage pocket. By angling the pocket in a non-vertical tilted condition (as shown) the equivalent vertical travel component of the lock bar is reduced sufficiently that the vehicle roof does not pose an obstruction to insertion or removal of the lock bar into (or out of) pocket 24.

Figure 2:
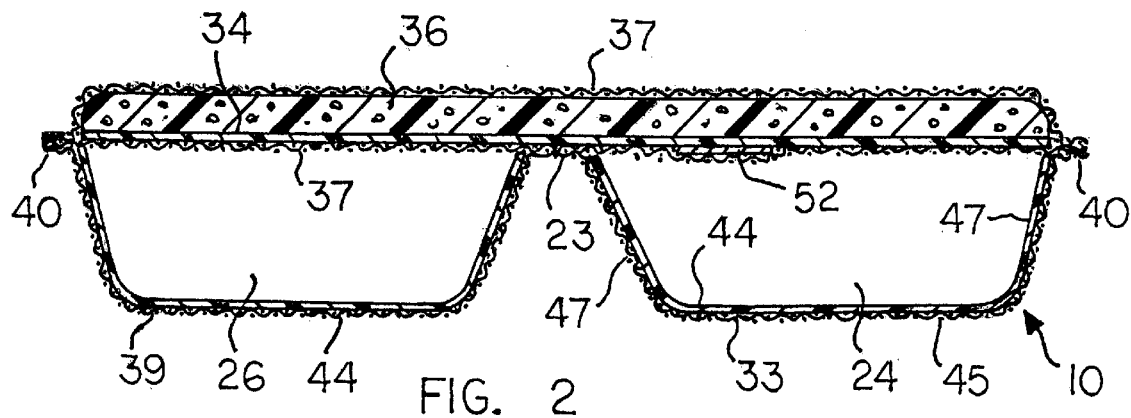
FIG. 2, is an enlarged cross-sectional view, taken on line 2—2 in FIG. 1.

FIG. 2, is an enlarged cross-sectional view, taken on line 2—2 in FIG. 1.

Figure 3:
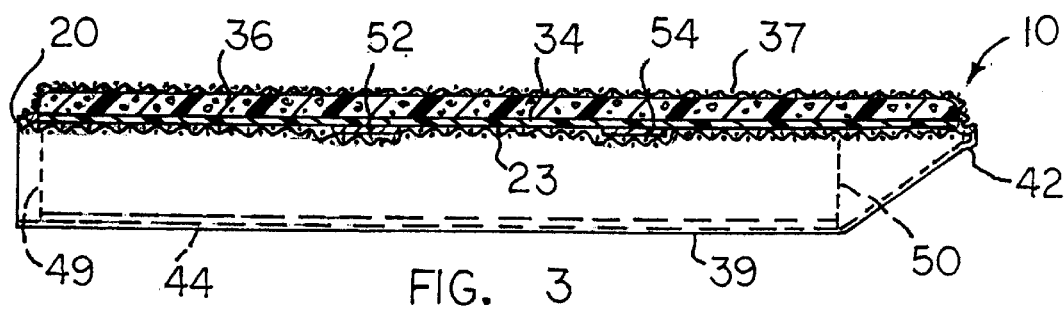
FIG. 3, is a longitudinal sectional view, taken on line 3—3 in FIG. 1.

FIG. 3, is a longitudinal sectional view, taken on line 3—3 in FIG. 1.

Holder 10 comprises a rectangular support panel 34 (FIG. 2) that defines the aforementioned edges 14, 16, 18 and 20. An elastomeric foam pad 36 having approximately the same size as panel 34 is secured to the panel surface presented to the vehicle seat back rear face. Panel 34 and pad 36 are enclosed in a cloth envelope 37 that includes two cloth walls sewn together along the panel 34 edges.

Holder 10, further comprises a flexible cloth cover sheet 39 having side edges 40, 40 and a lower edge 42, sewn to edge area of envelope 37. Also, a central strip area 23 of cloth sheet 39 is sewn to one wall of cloth envelope 37 to separate the holder into two separate pockets 24 and 26. At the lower edge area of cover sheet 39 the sheet material can be folded and doubled back on itself to compensate for the added width of cover sheet material, compared to the width dimension of support panel 34.

In order to maintain pocket 24 in an open (non-collapsed) condition the pocket is provided with an internal insert 44 having a channel cross section (as viewed in FIG. 2). A similar insert can be used in pocket 26. Each insert reinforces the cloth cover sheet 39 against collapsing against panel 34 so as to unduly narrow the entrance opening of the pocket at the upper edge 20 of the holder (casing).

Insert 44, has a U-shaped cross section formed by a web 45 engaging the inner surface of cover sheet 39 and two flanges 47 extending from web 45 into edge contact with the cloth envelope on panel 34. The insert has an upper end 49 located near the pocket entrance opening and a lower end 50 located relatively close to the pocket lower edge, such that the insert forms an elongated liner providing a degree of rigidity to the pocket.

Insert 44, is preferably formed of a plastic sheet material that is relatively rigid, yet at the same time deflectable. Should an occupant of the vehicle forcibly strike cloth cover sheet 39, as in a crash situation, insert 44 will deflect and at the same time absorb some of the shock energy, thereby lessening the human energy. The aim is to follow current Government concerns and rules against hard interior vehicle surfaces posing a human injury problem. Flanges 47, 47 of the insert can diverge in directions away from web 45 to promote insert deflection while at the same time maximizing the pocket cross section.

The drawings show holder 10 as having two separate elongated pockets 24 and 26. However, the holder could have a single pocket sized to hold only the steering wheel lock bar 25. The additional pocket 26 is provided to increase the usefulness of the holder in a practical fashion, without adding appreciably to the manufacturing cost of the holder. A holder embodying a single storage pocket could include a rigid support panel 34, foam pad 36, envelope 37, cover sheet 39, and single insert 44, modified to have a reduced width between the holder side edges 16 and 18.

The holder can be retained on the rear face of the seat back 12 by two flexible straps 52 and 54. Each strap has an intermediate section secured flatwise to one face of rigid support panel 34, an upper section extending upwardly beyond side edge 16 of the holder, and a lower section extending downwardly beyond side edge 18 of the holder.

A metal hook 56 is attached to the free end of the lower section of each strap 52 or 54 for attaching the straps to fixed anchorages at or near the vehicle floor 58. The lower section of each strap can be separated into two separate strap elements by a buckle 60 that permits one strap element to be adjusted longitudinally on the other element, whereby the strap length can be adjusted, as necessary to mate hooks 56 to the associated fixed anchorages. In some cases a transverse rod 62 on the seat support mechanism can be used as an anchorage for straps 52 and 54.

The upper end section 64 of strap 52 is elongated, so that it can be looped around a mounting post structure for a conventional head rest 66, located above the upper edge of the seat back 12. The looped portion of strap 52 can be extended downwardly through a buckle 68 on the upper end of strap 54, whereby straps 52 and 54 are tensioned to retain holder 10 on the rear face of seat back 12. The intermediate sections of straps 52 and 54 are acutely angled to side edges 16 and 18 of holder 10 so that when the straps are tensioned to vertical dispositions the holder is automatically tilted to a non-vertical orientation, as shown in FIG. 1.

Resilient pad 36 provides a cushioned interface between rigid panel 34 and the upholstered rear face of seat back 12, whereby the rigid panel does not abrade or wear the seat back material. The pad can be compressed slightly to maintain a desired tension on the straps, for preventing any tendency of the straps to loosen.

When holder 10 has been strapped onto the rear face of the seat back 12, the holder can be used for storing the steering wheel lock bar 25. Holder 10 is preferably mounted on the rear face of the passenger seat back (rather than the driver seat back). The driver can access pocket 24 by turning slightly and reaching his hand diagonally back toward the upper open end of the pocket.

The drawings necessarily show specific structural arrangements embodying the invention. However, it will be appreciated that the invention can be practiced in various forms and structural combinations.

The present invention, described above, relates to a storage holder for a steering wheel lock bar. Features of the present invention are recited in the appended claims. The drawings contained herein necessarily depict structural features and embodiments of the storage holder for a steering wheel lock bar, useful in the practice of the present invention.

However, it will be appreciated by those skilled in the arts pertaining thereto, that the present invention can be practiced in various alternate forms, proportions, and configurations. Further, the previous detailed description of the preferred embodiment of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed:

1. In an automotive vehicle having a steering wheel and an occupant seat, wherein the seat comprises a seat cushion and an upright seat back; the improvement comprising a holder for an elongated steering wheel lock bar; said holder comprising a casing having a support panel adapted to be positioned flatwise against the rear face of the vehicle seat back, said support panel having an upper edge, a lower edge, and two side edges;

a flexible cover sheet having an upper edge, a lower edge, and two side edges;

said support panel and said flexible cover sheet having their respective lower edges and side edges secured together; the upper edge of said cover sheet being separated from the upper edge of said support panel, to form an upwardly open lock bar storage pocket in the space between the support panel and cover sheet;

said pocket having a longitudinal axis extending parallel to the side edges of said support panel;

means for retaining said support panel in a non-vertical tilted condition on the rear surface of the vehicle seat back, said means for retaining being mounted to said support panel at an angle relative to the side edges of said support panel whereby said pocket longitudinal axis is acutely angled to a vertical plane normal to the seat back rear face; and said pocket having a longitudinal dimension that is approximately equal to the vertical dimension of the vehicle seat back; the angulation of said pocket being such that an elongated steering wheel lock bar is required to have a non-vertical orientation for insertion into said pocket.

2. The improvement, as described in claim 1, and further comprising an internal reinforcement means in said pocket for spacing the cover sheet from the support panel.

3. The improvement, as described in claim 1, and further comprising a U-shaped insert extending longitudinally within said pocket, whereby the cover sheet is spaced from the support panel.

4. The improvement, as described in claim 1, and further comprising an elongated U-shaped insert extending longitudinally within said pocket, whereby the cover sheet is spaced from the support panel; said U-shaped insert comprising a web engaging the cover sheet and flanges extending from said web into contact with the support panel.

5. The improvement, as described in claim 4, wherein said flanges diverge away from each other in a direction taken from the web to the flange free edges.

6. The improvement, as described in claim 5, wherein said U-shaped insert is formed of a flexible resilient material.

7. The improvement, as described in claim 5, wherein said U-shaped insert is formed of a flexible resilient material, whereby said web can deflect toward said support panel in response to forcible human contact with said cover sheet.

8. The improvement, as described in claim 4, wherein said U-shaped insert extends from the upper edge of said cover sheet to a point in near proximity to the cover sheet lower edge.

9. The improvement, as described in claim 1, wherein said panel retaining means comprises flexible strap means extending from the support panel beyond the panel side edges.

10. The improvement, as described in claim 9, wherein said flexible strap means comprises two parallel strap sections extending across said panel between the panel side edges; said parallel strap sections being acutely angled to the panel side edges.

11. The improvement, as described in claim 9, wherein said flexible strap means comprises two parallel strap sections extending across said panel between the panel side edges; said parallel strap sections being acutely angled to the panel side edges so that said parallel strap sections are in parallel vertical planes when the support panel is positioned on a rear face of a vehicle seat back.

12. The improvement, as described in claim 1, wherein said panel retaining means comprises two separate straps secured to said panel;

each strap comprising an intermediate section attached to said panel, an upper flexible section extending upwardly from the panel, and a lower flexible section extending downwardly from the panel;

each strap having an anchorage means on its lower section adapted to resist upward displacement of the support panel along the rear surface of the vehicle seat back; and the upper section of one strap being adapted to be looped around a headrest mounting means on the vehicle seat back for connection with the upper section of the other strap, whereby the support panel is supported against downward displacement along the rear face of the vehicle seat back.

13. The improvement, as described in claim 12, wherein each said anchorage means comprises a hook.

14. The improvement, as described in claim 12, wherein the lower section of each said strap has a length adjustment means therein.

15. The improvement, as described in claim 12, wherein the intermediate sections of said straps are acutely angled to the panel side edges so as to be in parallel vertical planes when the support panel is positioned on a rear face of a vehicle seat back.

16. The improvement, as described in claim 1, wherein said support panel has a first surface facing the cover sheet and a second surface adapted to face the rear face of the vehicle seat back; and a resilient pad adhered to said second surface of the support panel.

17. The improvement, as described in claim 1, wherein said support panel has a first surface facing the cover sheet and a second surface adapted to face the rear face of the vehicle seat back; and a resilient pad adhered to said second surface of the support pad, whereby said pad is compressed when the panel is in a retained position on the rear face of a vehicle seat back.

18. The improvement, as described in claim 17, wherein said resilient pad is formed of a resilient foam material.

19. The improvement, as described in claim 17, and further comprising a cloth sheath envelope encircling said support panel and said resilient pad.

20. The improvement, as described in claim 1, wherein said cover sheet has a central strip area secured to said support panel along a line that is parallel to the pocket longitudinal axis; said central strip area being spaced from the side edges of the cover sheet to form a second pocket open along the upper edge of the support panel.

\* \* \* \* \*